(12) United States Patent
Brooks et al.

(10) Patent No.: US 10,978,920 B2
(45) Date of Patent: Apr. 13, 2021

(54) ASSISTING WIRELESS TRANSFER OF POWER TO A MACHINE

(71) Applicant: Hewlett-Packard Development Company, L.P., Houston, TX (US)

(72) Inventors: Robert C Brooks, Houston, TX (US); Robin T Castell, Houston, TX (US); Monji G Jabori, Houston, TX (US); Harold Merkel, Houston, TX (US); Lee Atkinson, Taipei (TW); Charles J Stancil, Tomball, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 481 days.

(21) Appl. No.: 15/521,994

(22) PCT Filed: Nov. 5, 2014

(86) PCT No.: PCT/US2014/064117
§ 371 (c)(1),
(2) Date: Apr. 26, 2017

(87) PCT Pub. No.: WO2016/072981
PCT Pub. Date: May 12, 2016

(65) Prior Publication Data
US 2017/0331335 A1    Nov. 16, 2017

(51) Int. Cl.
*H02J 50/80* (2016.01)
*G06F 1/26* (2006.01)
(Continued)

(52) U.S. Cl.
CPC ............. *H02J 50/80* (2016.02); *G06F 1/1632* (2013.01); *G06F 1/26* (2013.01); *G06F 1/266* (2013.01);
(Continued)

(58) Field of Classification Search
CPC .. H02J 7/025; H02J 50/80; H02J 5/005; H02J 50/40; H02J 50/10; H02J 2007/0096;
(Continued)

(56) References Cited

U.S. PATENT DOCUMENTS 7,705,565 B2   4/2010   Patino et al.
7,948,209 B2   5/2011   Jung
(Continued)

FOREIGN PATENT DOCUMENTS

CN  103441550 A   12/2013
TW  201101639 A1   1/2011
TW  201347349 A   11/2013
WO  WO-2014-110323 A1   7/2014

OTHER PUBLICATIONS

"Charge Your Phone Wirelessly," Kyocera Hydro Vibe User Guide, 2014, pp. 1-2, eguides.sprint.com/support/eguides/.

*Primary Examiner* — Keith Ferguson
(74) *Attorney, Agent, or Firm* — Trop Pruner & Hu PC (57) ABSTRACT

A technique includes sensing a wireless charging station that includes a wireless charging transmitter and determining a status for the machine based at least in part on the sensing of the wireless charging station. The technique also includes assisting with a process to wirelessly transfer power to the machine, where assisting includes causing the machine to provide guidance to the user based at least in part on the determined status.

13 Claims, 11 Drawing Sheets

(51) Int. Cl.
*H02J 50/10* (2016.01)
*H04B 5/00* (2006.01)
*H02J 50/90* (2016.01)
*H02J 7/02* (2016.01)
*G06F 1/16* (2006.01)
*H02J 50/60* (2016.01)
*H02J 7/00* (2006.01)

(52) U.S. Cl.
CPC .............. *H02J 7/025* (2013.01); *H02J 50/10* (2016.02); *H02J 50/60* (2016.02); *H02J 50/90* (2016.02); *H04B 5/0037* (2013.01); *H02J 7/00045* (2020.01)

(58) Field of Classification Search
CPC ........ H02J 7/0027; H02J 7/007; H02J 7/0054; H02J 2007/005
USPC ........... 455/573, 572, 550.1, 574, 73, 575.1, 455/90.1–90.3, 41.1–41.3, 557, 556.1; 320/108, 137, 114, 115
See application file for complete search history.

(56) References Cited

U.S. PATENT DOCUMENTS

| | | | |
|---|---|---|---|
| 8,373,386 B2 | 2/2013 | Baarman et al. | |
| 8,890,470 B2* | 11/2014 | Partovi | H01F 7/0252 |
| | | | 320/108 |
| 9,743,565 B2* | 8/2017 | Van Den Brink | H05K 9/0049 |
| 2009/0312046 A1 | 12/2009 | Clevenger et al. | |
| 2011/0018360 A1* | 1/2011 | Baarman | H02J 5/005 |
| | | | 307/104 |
| 2012/0146576 A1 | 6/2012 | Partovi et al. | |
| 2012/0326524 A1 | 12/2012 | Matsumoto et al. | |
| 2013/0091225 A1 | 4/2013 | Eaton | |
| 2013/0307473 A1 | 11/2013 | Han et al. | |
| 2013/0310112 A1 | 11/2013 | You et al. | |
| 2014/0002013 A1 | 1/2014 | Kossi et al. | |
| 2014/0091626 A1 | 4/2014 | Walley et al. | |
| 2014/0125276 A1 | 5/2014 | Lampinen | |
| 2015/0022194 A1* | 1/2015 | Almalki | G01R 33/02 |
| | | | 324/244 |

* cited by examiner

ASSISTING WIRELESS TRANSFER OF POWER TO A MACHINE

BACKGROUND

One way to charge a battery of a portable electronic device (a smartphone, a notebook computer, a tablet, and so forth) is to physically connect the device to a cable, which communicates power from a Universal Serial Bus (USB) hub, AC wall adapter, and so forth. Another way to charge a portable electronic device's battery is to wirelessly transfer power to the device from a wireless charging station.

DETAILED DESCRIPTION

Systems and techniques are disclosed herein for purposes of assisting a user of a portable electronic device with a process to wirelessly transfer power to the device. This assistance may involve informing the user about one or more of the following: detection of a nearby wireless charging station; proper orientation of the portable electronic device relative to the wireless charging station; one or multiple characteristics of the wireless charging station; one or multiple incompatibilities that are present in a given wireless charging environment; power available for charging a battery of the portable electronic device; and battery charging times for different user activities, as just a few examples. As just a few examples, the portable electronic device may be a smartphone, a notebook computer, a tablet, a wireless headphone, or a battery charger that has wireless charging capability.

As described herein, based on potentially many different factors, the wireless transfer of power between a given portable electronic device and a given wireless charging station may or may not occur; and if the wireless transfer of power occurs, the power may be distributed in the portable electronic device to serve a number of different functions. As examples, the wirelessly transferred power may be used for the sole purpose of charging a battery of the portable electronic device, for the sole purpose of powering user functions (email, web surfing, game playing, messaging, music listening, video watching, and so forth) of the portable electronic device, or for some combination of charging the battery and powering user functions.

In accordance with example implementations, the portable electronic device senses the presence of a nearby wireless charging station, determines one or multiple characteristics of the station and determines a wireless charging status for the device in response thereto. In general, the "wireless charging status" refers to a state or characteristic of the wireless charging environment for the portable electronic device and may represent or indicate (as examples) the ability for the wireless transfer of power between the device and a wireless charging station to occur; the compatibility/incompatibility of components of the wireless charging environment; the compatibility/incompatibility of standards used by different components of the wireless charging environment; power available to power user functions on the device while the device's battery is being charged; power available to charge the device's battery; and so forth.

In accordance with example implementations, the portable electronic device is constructed to provide guidance to the user through audio communication, visual communication or by providing other sensory stimuli to the user. The guidance may be used for purposes of regulating one or multiple aspects that are controlled by the user in a process to wirelessly transfer power to the portable electronic device, such as orienting and/or repositioning of the portable electronic device relative to a wireless charging station; modifying power usage of the portable electronic device before power is wirelessly communicated to the device or while charging of the battery is occurring; removing the portable electronic device from the current wireless charging environment; initiating wireless charging of the portable electronic device; and so forth.

Moreover, as described herein, in accordance with example implementations, the portable electronic device is constructed to inform the user about the wireless power transfer status of another device. For example, a user may dispose a wireless headphone on a wireless charging station, and the user's notebook computer may wirelessly communicate with the wireless charging station to determine a wireless power transfer status for the headphone and display the status to the user.

Figure 1:
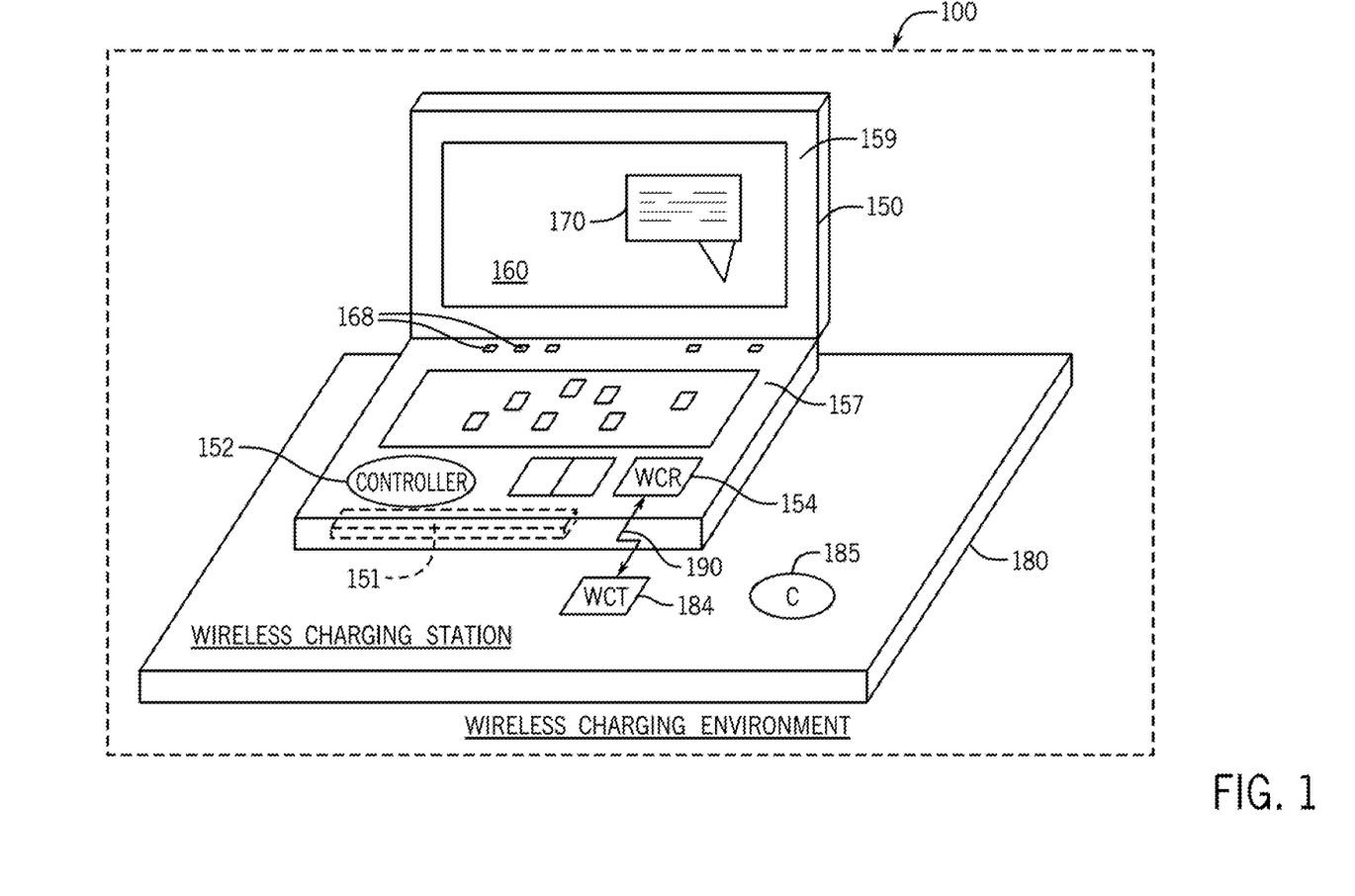
FIG. 1 is a schematic diagram of a wireless charging environment according to an example implementation.

As a more specific example, FIG. 1 depicts a wireless charging environment 100 in accordance with some implementations. For the wireless charging environment 100, a notebook computer 150 (i.e., a portable electronic device according to an example implementation) is in proximity to (rests on, for example) a wireless charging station 180, such as a pad-based wireless charging station.

The notebook computer 150 has a rechargeable battery 151. Moreover, in general, the notebook computer 150 includes a lower housing 157 that may contain, as example, the battery 151, a motherboard, a power supply system, speakers, communication interfaces, communication connectors, a keyboard, and so forth; and the notebook computer 150 includes an upper housing 159 that contains a display 160, camera, and so forth. The notebook computer 150 also contains a wireless charging receiver 154, which for the example implementation depicted in FIG. 1, is disposed in the lower housing 157.

The wireless charging station 180 includes a wireless charging transmitter 184, which contains an electrical wire winding, or coil. The wireless charging station 180 energizes the coil of the wireless charging transmitter 184 for purposes of wirelessly communicating or transferring power to a wireless charging receiver of a device (such as the notebook computer 150) that receives power from the station 180. In this manner, to wirelessly communicate the power, the wireless charging station 180 produces an alternating electromagnetic field in the coil of the wireless charging transmitter 184, and for a compatible wireless charging receiver, the alternating electromagnetic field induces a voltage and a current in a coil of the receiver, thereby transferring power. Effectively, the coils of the transmitter and receiver are inductively coupled together to form a transformer to transfer the power.

In FIG. 1, the wireless charging receiver 154 may be used to wirelessly receive power for the notebook computer 150, so that the wireless power may be used to charge the battery 151 and/or power user functions on the computer 150. Wireless communication of power (schematically represented in FIG. 1 by reference numeral "190") may occur if several conditions are satisfied, such as the wireless charging receiver 154 being properly oriented with respect to the wireless charging transmitter 184.

In other words, if coils of the wireless charging transmitter 184 and receiver 154 are not properly aligned, then a sufficient inductive coupling connection may not be formed. Moreover, other factors may be determinative whether or not a wireless transfer of power may occur. For example, the wireless charging station 180 and notebook computer 150 may use relatively incompatible wireless charging standards (the Qi, Power Matters Alliance (PMA) or Alliance for Wireless Power (A4WP) standards, as examples). As another example, the wireless charging transmitter 184 and receiver 154 may be incompatible with one another.

Assuming compatibility exists for wireless power transfer to occur, several other factors may influence the amount of power that is available from a wireless charging station and how that power is distributed in the notebook computer 150. For example, the amount of power that is available for charging the battery 151 may be a function of user activities occurring on the notebook computer 150; and other portable electronic devices (not shown in FIG. 1) may be also be simultaneously receiving power from the wireless charging station, thereby restricting the amount of power that the wireless charging station may provide to the notebook computer 150.

In accordance with example implementations, for purposes of assisting the user and regulating the wireless transfer of power to the notebook computer 150, the computer 150 contains a wireless charging controller 152, which may be a utility or an application that is formed by machine executable instructions (or "software") executing on a CPU of the computer 150. In further example implementations, the wireless charging controller 152 may be formed from dedicated circuitry or hardware of the computer 150.

Regardless of its particular form, the controller 152 monitors various aspects of the wireless charging environment 100, determines a corresponding wireless charging status for the notebook computer 150, provides an indication of the wireless charging status to a user of the notebook computer and provides guidance to the user to regulate a process to wirelessly transfer power to the notebook computer 150.

As specific examples, the notebook computer 150 may indicate, or communicate, guidance to the user by displaying a message 170 on the display 160 of the notebook computer 150, through one or multiple light emitting diodes (LEDs) 168 of the notebook computer 150, through computer-generated speech or other sounds communicated through the notebook computer's speakers, and so forth.

Figure 2:
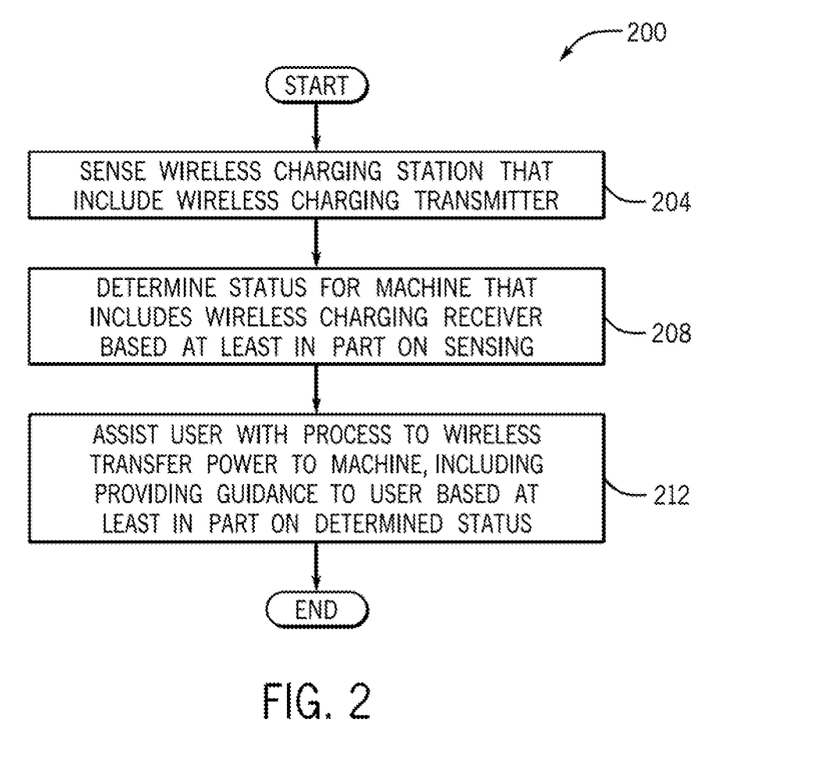
FIG. 2 is a flow diagram depicting a technique to assist a process to wirelessly transfer power to a machine according to an example implementation.

Referring to FIG. 2 in conjunction with FIG. 1, in accordance with example implementations, the controller (such as the wireless charging controller 152) performs a technique 200, which includes sensing (block 204) a wireless charging station and determining (block 208) a status for a machine (such as the notebook computer 150) based at least in part on the sensing. The controller assists (block 212) the user with a process to wirelessly transfer power to the machine, including providing guidance to the user based at least in part on the determined status.

In accordance with example implementations, the wireless charging controller 152 provides feedback that guides proper orientation of the notebook computer 150 relative to the wireless charging station 180 for purposes of aligning the wireless charging receiver 154 of the computer 150 with the wireless charging transmitter 184. In this regard, a given wireless charging station may have one or multiple wireless charging transmitters that are correspondingly disposed at one or multiple locations. In accordance with example implementations, the wireless charging controller 152 uses electrical wire windings, or coils, as described further herein, to sense proximity of a given wireless charging transmitter and correspondingly provide information for the user to guide the physical orientation of the notebook computer 150 so that the wireless charging receiver 154 may be properly aligned with the wireless charging transmitter.

For example, in accordance with example implementations, the wireless charging controller 152 may display the following on the display 160 of the notebook computer 150: an image of a wireless charging pad, an image of the notebook computer 150, a highlighted portion of a wireless charging pad where the notebook computer 150 should be placed, and a directional arrow showing how the notebook computer 150 should be moved for proper placement on the charging pad.

Figure 3A:
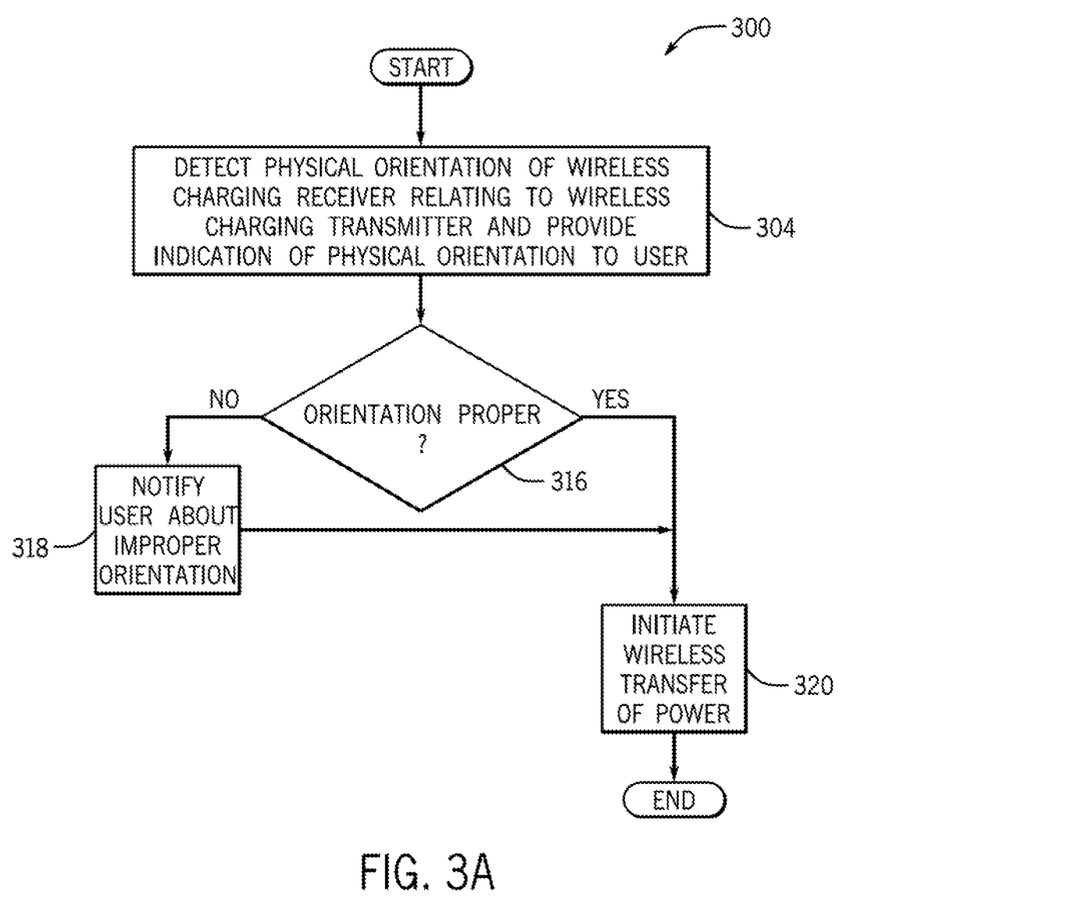
FIG. 3A is a flow diagram depicting a technique to physically orient a wireless charging receiver of a portable electronic device with respect to a wireless charging transmitter of a wireless charging station according to an example implementation.

In accordance with example implementations, the wireless charging controller 152 provides the guidance as follows. Referring to FIG. 3A in conjunction with FIG. 1, according to example implementations, the controller 152 may perform a technique 300 that includes detecting (block 304) the physical orientation of a wireless charging receiver relative to a wireless charging transmitter and providing an indication to a user of the physical orientation. Through this feedback, the user may then position or reposition the portable electronic device, as indicated by the feedback from the device. The technique 300 includes determining (decision block 316) whether the orientation is proper for wireless power transfer to occur. If not, the controller 152 notifies (block 318) the user about the improper orientation. The controller 152 may then initiate (block 320) wireless charging. In this manner, in accordance with example implementations, the controller 152 may selectively initiate charging (begin charging or not begin charging) based at least in part on user feedback to the indicated orientation and/or other indication of wireless power transfer status, which the notebook computer 150 provides.

Figure 4A:
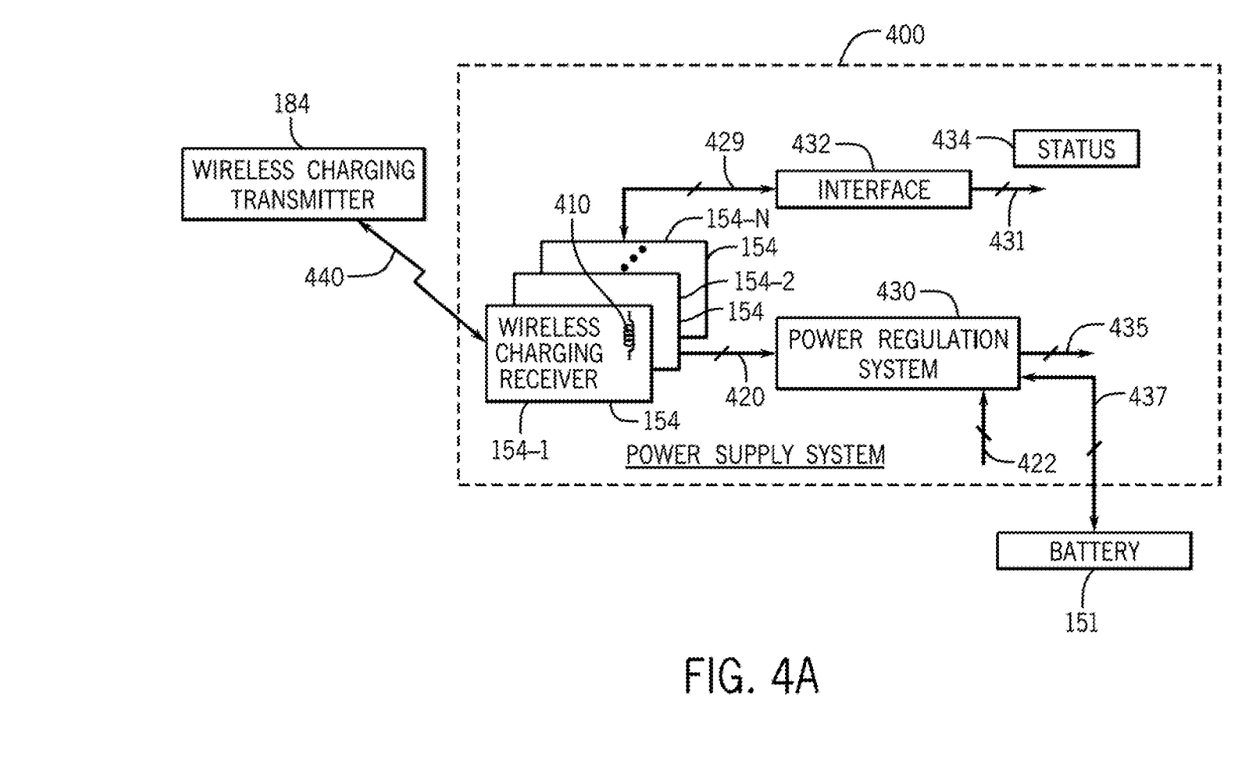
FIGS. 4A and 4B are schematic diagrams of power supply systems of a portable electronic device according to example implementations.

The notebook computer 150 may use one of several different techniques to detect a wireless charging transmitter, depending on the specific implementation. FIG. 4A depicts an example power supply system 400 of the notebook computer 150 in accordance with an example implementation. Referring to FIG. 4A in conjunction with FIG. 1, the power supply system 400 includes a power regulation system 430 that distributes power to components of the notebook computer 150 and which may receive power from several sources. In this manner, the power regulation system 430 provides power to power supply rails 435, and the power regulation system 430 is coupled to terminals 437 of the battery 151 to provide power to charge the battery 151.

The power regulation system 430 may receive power from the battery 151, from a wireless charging station, or from another source (as represented by power communication lines 422), such as an AC wall adapter or a USB hub. The power regulation system 430 receives the power from a wireless charging station from power communication lines 420 that are coupled to a wireless charging receiver 154 of the notebook computer 150. In this manner, as depicted in FIG. 4A, in accordance with example implementations, the notebook computer 150 contains N wireless charging receivers 154 (wireless charging receivers 154-1 . . . 154-N, being depicted as examples in FIG. 4A), and each wireless charging receiver 154 contains an associated electrical wire winding, or coil 410.

In this manner, a given wireless charging transmitter 184 may or may not be compatible with the power supply system 400. However, the wireless charging receivers 154 may each be associated with a different wireless charging standard and as such, provide an indication of the detection of a given wireless charging transmitter that is associated with the detected standard. The receivers 154 are coupled to an interface 432 for purposes of storing status data 434, which indicates when a particular receiver 154 has detected a wireless charging transmitter 184. As an example, when the status data changes, the interface 432 may generate an interrupt on its output 431, and the controller 152 (FIG. 1) may then read the status data 434 for purposes of identifying the wireless charging transmitter 184 that is near the notebook computer 150.

Using the status data 434, the controller 152 may further determine whether wireless power transfer can or cannot occur due to relative compatibilities. If the detected wireless charging transmitter 184 is compatible with one of the receivers 154 and if the transmitter 184 uses a wireless charging standard that is compatible with the one used by the notebook computer 150, then a wireless power communication path 440 is established with the appropriate receiver 154. The power regulation system 430 may route then power to charge the battery 151 and/or route power to supply rails 435 of the notebook computer 150, depending on the amount of available power, as further described herein.

In accordance with further example implementations, the power supply system 400 may be constructed to receive wirelessly-transferred power using one of multiple wireless communication standards.

It is noted that a given wireless charging receiver 154 may detect proximity of a wireless charging transmitter and communicate with the transmitter using a number of different techniques. For example, a given wireless charging receiver 154 may use inband communication through its coil 410, in that both power and messages may be communicated with the wireless charging transmitter of a wireless charging station using the coil 410. In further example implementations, a given wireless charging receiver 154 may communicate with a wireless charging station using out of band communication, such as through Bluetooth communication, for example.

Figure 3B:
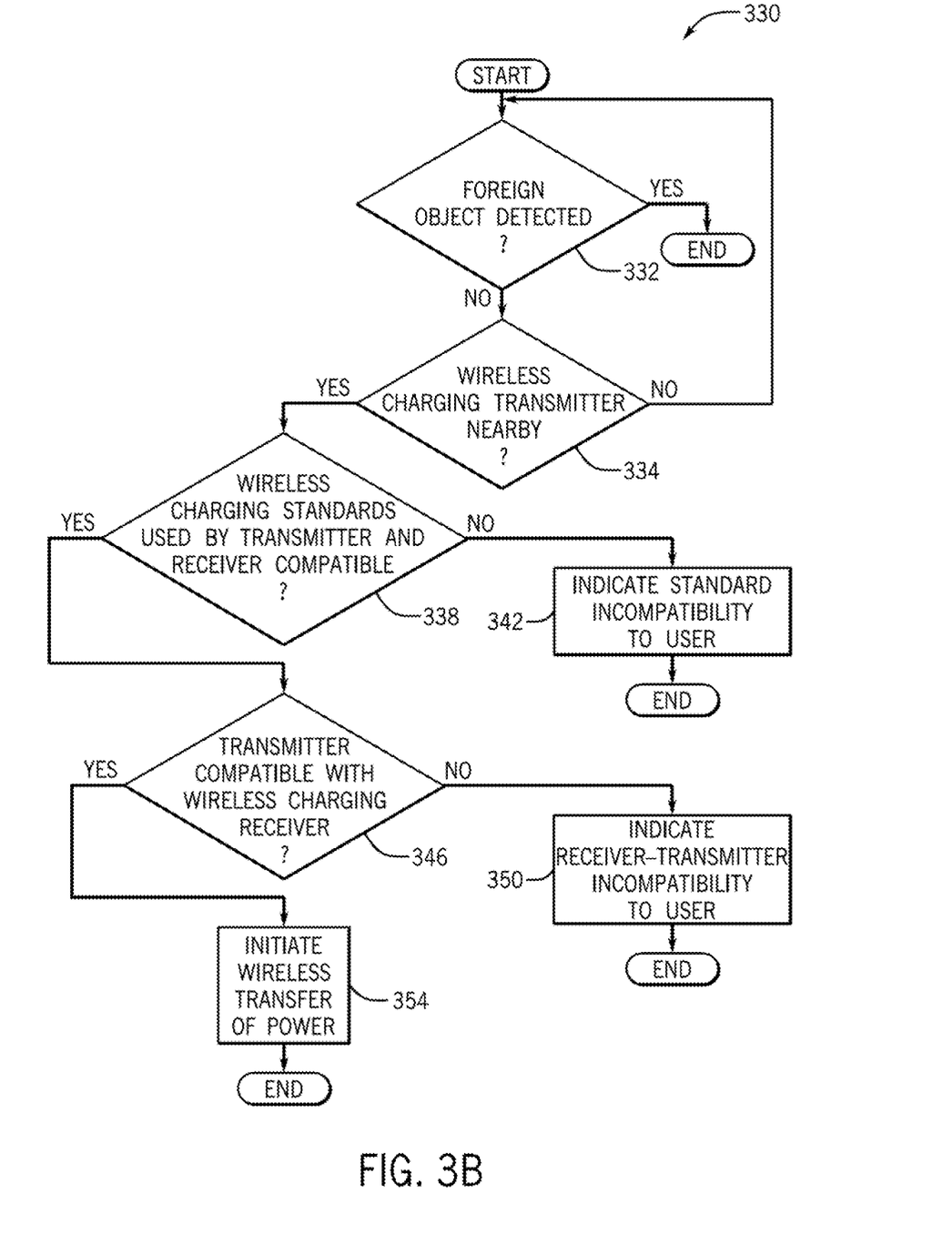
FIG. 3B is a flow diagram depicting a technique to assist a process to wirelessly transfer power to a portable electronic device based on detected compatibilities according to an example implementation.

Thus, referring to FIG. 3B, in accordance with example implementations, a technique 330 includes determining (decision block 334) whether a wireless charging transmitter is nearby, and if so, the technique 330 includes determining (decision block 346) whether the wireless charging standards that are used by the transmitter and receiver are compatible. If not, the standards incompatibility is indicated (block 350) to the user. If the standards are compatible, then the technique 330 includes evaluating compatibility within the standard. In this manner, the technique 330 includes determining (decision block 346) whether the transmitter is compatible with the wireless charging receiver. If not, the technique 330 includes indicating (block 342) the receiver-transmitter incompatibility to the user of the portable electronic device. If, however, the transmitter is compatible (decision block 346) with the wireless charging receiver, wireless transfer of power is initiated, pursuant to block 354.

Figure 4B:
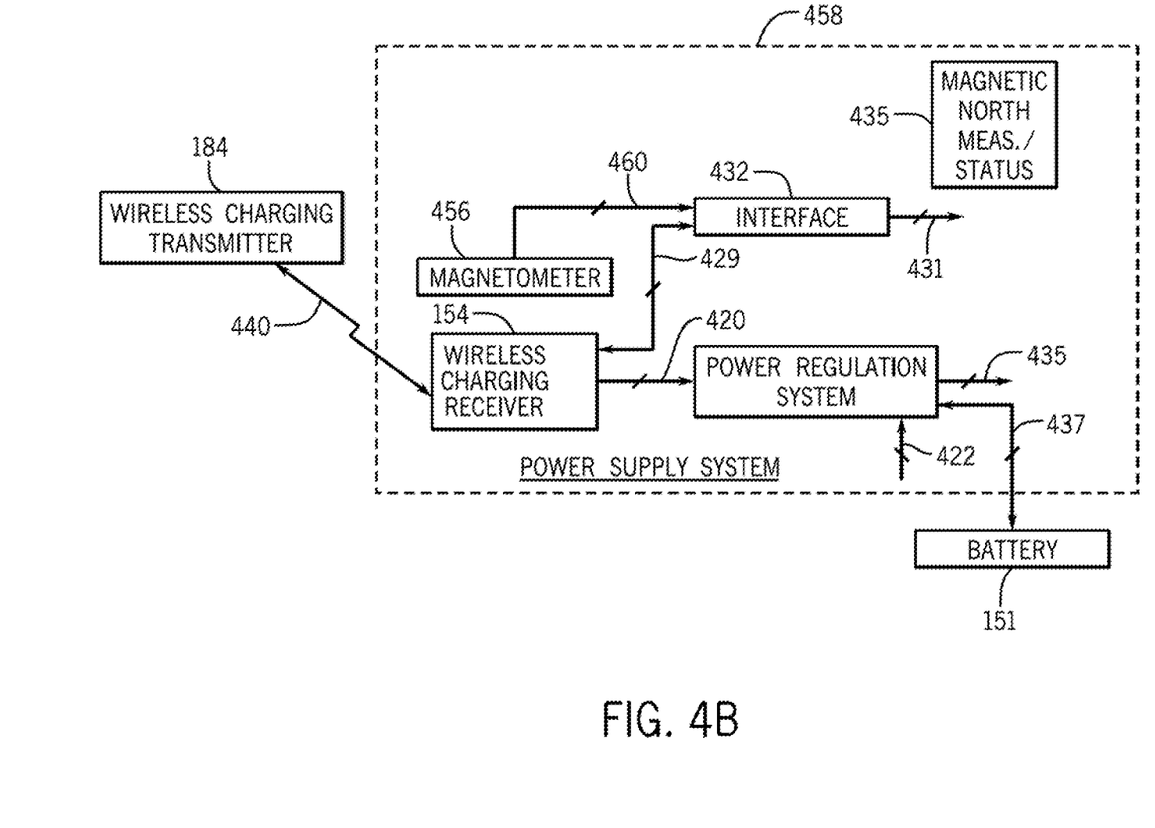

Referring to FIG. 4B in conjunction with FIGS. 1 and 4A, in accordance with further example implementations, the notebook computer 150 may have a power supply system 458 that has similar features to the power supply system 400 of FIG. 4A and with the similar features being denoted by similar reference numerals. Unlike the power supply system 400, however, the power supply system 458 includes a dedicated coil, or winding, for purposes of detecting energy that is consistent with a wireless charging transmitter for purposes of detecting when the notebook computer 150 is in proximity to such a transmitter. In this manner, when a given wireless charging transmitter is detected, then a wireless charging receiver 154 of the power supply system 458 may use the appropriate inband or out of band communication (depending on the particular standard) for purposes of attempting to form a connection with the transmitter.

For the example implementation of FIG. 4B, the notebook computer 150 uses an electrical wire winding, or coil, of a magnetometer 456 of the computer 150. In this regard, the magnetometer 456 may be used in the notebook computer 150 for the dual purposes of detecting a wireless charging transmitter and detecting the direction of magnetic north.

In accordance with example implementations, the magnetometer 456 communicates data 435 at its output 460, which, in general, is either a magnetic north measurement or data that indicates a magnetic field strength of a nearby wireless charging transmitter 184. As shown in FIG. 4B, the data 435 is stored in the interface 432 and may be accessed by the controller 152 (FIG. 1). When a wireless charging transmitter 184 is sufficiently far away from the magnetometer 456, the data 435 represents a vector for magnetic north. However, when a wireless charging transmitter 184 is sufficiently close to the magnetometer 456, the time varying electromagnetic field produced by the transmitter 184 causes a characterizing signature to be imposed on the magnetometer's measurement. For example, when a wireless charging transmitter 184 is nearby, the magnitude, frequency and/or time properties of the magnetometer's measurement may be altered such that the controller 152 may recognize the presence of the transmitter 184 from the data 435.

Figure 5:
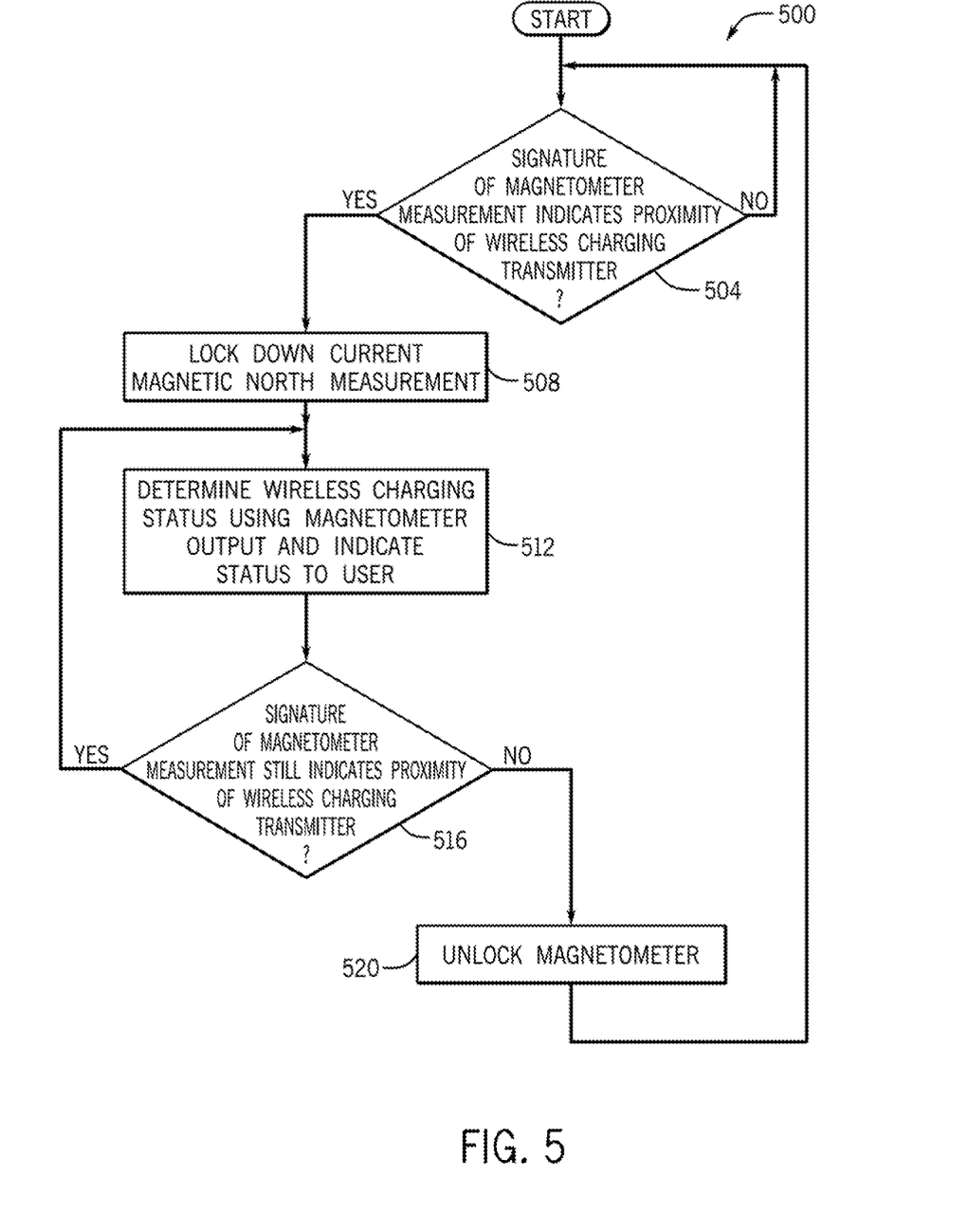
FIG. 5 is a flow diagram depicting a technique to use a magnetometer of a portable electronic device to sense proximity of a wireless charging transmitter according to an example implementation.

Upon recognizing the presence of the wireless charging transmitter 185, the controller 152 may then take measures to prevent the data 435 from being used as a magnetic north measurement. As a more specific example, the wireless charging controller 152 may use a technique 500 that is depicted in FIG. 5. Referring to FIG. 5 in conjunction with FIG. 4B, in accordance with example implementations, the technique 500 includes determining (decision block 504) whether a signature of a magnetometer signal indicates proximity of a wireless charging transmitter. If so, the technique 500 includes locking down (block 508) the current magnetic north measurement; and determining a current wireless charging status indicating the status to the user, pursuant to block 512. In this context, "locking" of the magnetic north measurement refers to preventing the magnetometer's signal from being used to update a magnetic north measurement for the notebook computer 150, and the locking may be performed, in accordance with example implementations, by setting a flag state in the interface 432, for example.

As long as the signature of the magnetometer signal indicates proximity of the wireless transmitter (decision block 516), the magnetic north measurement remains locked down, and the magnetometer output is used to determine relative position/orientation of the wireless charging transmitter. When the signature of the magnetometer signal no longer indicates proximity of a wireless charging transmitter (pursuant to decision block 516), then the magnetic north measurement is unlocked, pursuant to block 520, and control returns to decision block 504.

In accordance with example implementations, wireless charging controller 152 may use magnetometer data (if available) and/or charge power level data to guide the placement of the notebook computer 150 on the charging station. It is noted that the physical orientation and relative positional data may not be available from the magnetometer 456 under all configuration scenarios. In such cases, the power transfer level to the device may be used as an indication of relative position. Without knowing absolute position, the wireless charging controller 152 may direct the user to move the notebook computer 150 (or other electronic device) on the charging station (charging mat, for example) in the up, down, left, and right positions (or other feedback) until the computer 150 has been positioned for optimum or maximum charge. In accordance with example implementations, charging power may not be gated, or held off, until the proper orientation/location is achieved. Rather, the wireless charging controller 152 may initiate charging as soon as power can be transferred (although perhaps not optimally), and as the notebook computer 150 (or other electronic device) charges, the controller 152 may use both magnetometer data (if available) and charge power level data to guide the user for optimum position and charging.

It is noted that, in accordance with example implementations, the above-described technique of locking down of a magnetometer's output of a portable electronic device in response to the detection of a wireless charging transmitter may be beneficial to the operation of the portable electronic device, even if the device does not contain a wireless charging receiver.

The magnetometer and wireless charging receiver coils described herein are merely examples of implementations in which the portable electronic device has multiple coils for purposes of assisting in the transfer of power to the device. In accordance with example implementations, in addition to a coil to receive power, the portable electronic device may include multiple coils for purposes of detecting an electromagnetic field (such as the field generated by a wireless charging transmitter) and measuring strengths of the electromagnetic field (via multiple coils) at the corresponding coil locations so that guide placement of the portable electronic device (and its wireless charging receiver).

Referring back to FIG. 1, multiple charging power levels may exist within a given wireless charging standard. As a result, a user who wants to simply wireless charge the notebook computer 150 may be confused and/or frustrated by varying rates at which the notebook computer 150 may potentially charge, the ability to actually use the notebook computer 150 while it is being wirelessly charged with some wirelessly charging transmitters but not others, and the ability to use the notebook computer 150 for a limited time while it is being wirelessly charged.

As a more specific example, a given wireless charging station may be capable of delivering 5 Watts (W), 10W or 20W to the notebook computer 150. Moreover, the ability of the user to use the notebook computer 150 while the computer 150 is being wirelessly charged may be available with some wireless charging transmitters but not with others. Additionally, whether or not the notebook computer 150 is capable of fully functioning while charging is a function of the wireless charging transmitter's output power and the power used by the notebook computer during normal operation. In this manner, some wireless charging transmitters may deliver sufficient power to allow the notebook computer 150 to function normally while it is being charged; and other wireless charging transmitters may not transmit sufficient power, with the option being to shut down the notebook computer 150 entirely to let the computer 150 charge.

Depending on the particular power that is available for charging, the notebook computer 150 may also be constrained to operate for a limited time while being charged. For example, the battery 151 of the notebook computer 150 may have a sufficient charge to operate for some amount of time before the battery 151 is drained. More specifically, the user of the notebook computer 150 may experience one of the following scenarios. In the first scenario, the wireless charging station delivers insufficient power to fully power the notebook computer 150 during normal operation so the battery's charge may be extended due to the fact it is being wirelessly charged. Eventually, however, the battery 151 will be drained.

In the second scenario, the wireless charging station delivers sufficient power to fully power the notebook computer 150 during normal operation, but there is insufficient additional power to charge the notebook computer's battery 151 or charge the battery at a sufficient rate. In the third scenario, the wireless charging station may deliver sufficient power to fully power the notebook computer 150 during normal operation and in addition, charge the notebook computer's battery 151.

Figure 3C:
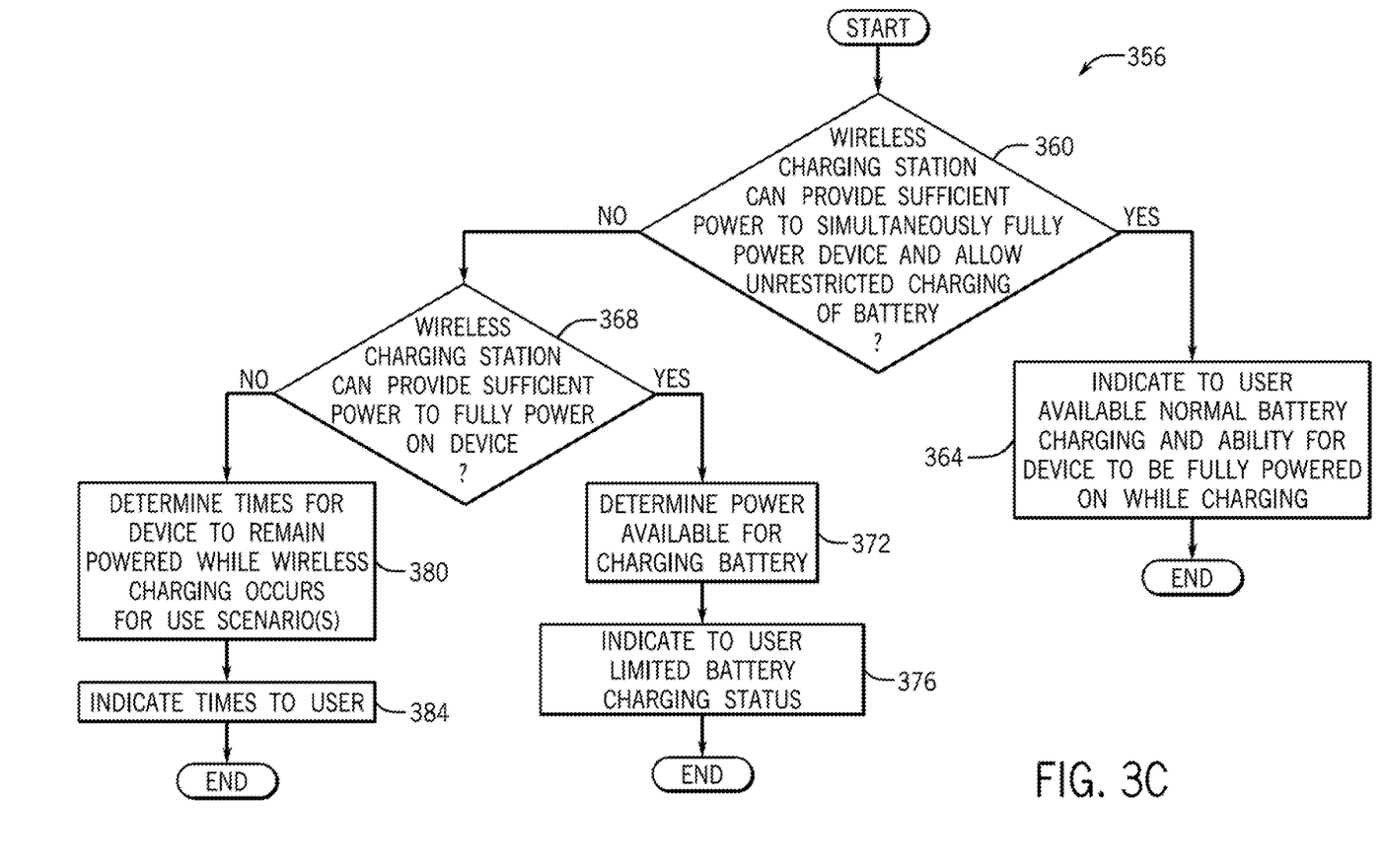
FIG. 3C is a flow diagram depicting a technique to assist a process to wirelessly transfer power to a portable electronic device based on the power available to charge a battery of the device according to an example implementation.

For purposes of avoiding confusion of the user and allowing the user to make informed decisions regarding charging of a portable electronic device, the wireless charging controller 152 may perform a technique 356 that is depicted in FIG. 3C, in accordance with example implementations. Referring to FIG. 3C in conjunction with FIG. 1, pursuant to the technique 356, the controller 152 determines (decision block 360) whether the wireless charging station can deliver sufficient power to fully power the portable electronic device and allow unrestricted charging of the battery (allow charging of the battery at a sufficiently fast rate). If so, the controller 152 indicates (block 364) to the user a normal battery charging capability and the ability for the device to be fully powered on while charging.

Otherwise, if the wireless charging station cannot deliver sufficient power to fully power the device and allow unrestricted charging (decision block 360), the controller 152 determines (decision block 368) whether the wireless charging station can fully power on the portable electronic device.

In other words, the portable electronic device may be fully powered on, but charging of the battery may be restricted. In such a scenario, the controller 152 determines (block 372) the power that is available for charging the battery and indicates (block 376) the limited battery charging status to the user.

If power from the wireless charging station is insufficient to allow the portable electronic device to be fully powered on (pursuant to decision block 368), then the controller 152 determines (block 380) the times for the device to remain powered on while the wireless charging occurs for multiple use scenarios. For example, in accordance with some implementations, the wireless charging controller 152 may determine times for the following activities until the portable electronic device shuts down: the portable electronic device being turned off; the portable electronic device being operated in a standby mode; the portable electronic device being used for messaging; the portable electronic device being used to view a movie; the portable electronic device being used to listen to music; and the portable electronic device being used to play a game, as just a few examples. Pursuant to block 384, the controller 152 indicates times for the multiple scenarios to the user (display the times on a display of the device, for example).

In accordance with further example implementations, the portable electronic device may charge its battery from a power source other than a wireless power source (a power source plugged into an AC outlet, for example) that is incapable of supplying sufficient power to fully power the electronic device and allow unrestricted power; and the controller 152 may determine the times for the portable electronic device to remain powered on while charging of the device's battery occurs using this non-wireless power source and indicate the times to the user.

Figure 6:
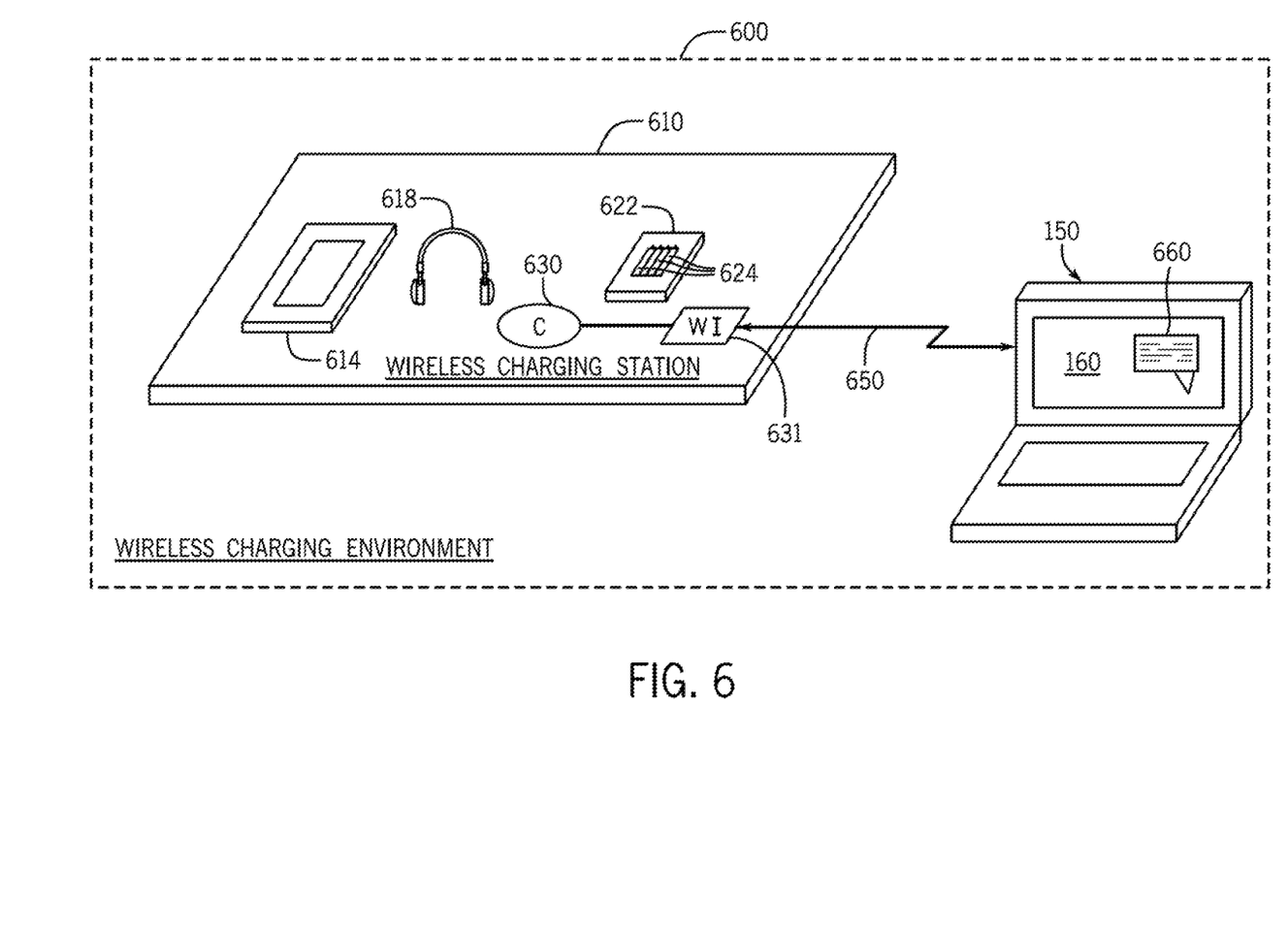
FIG. 6 is a schematic diagram of a wireless charging environment according to a further example implementation.

In accordance with further example implementations, a given portable electronic device may be used to determine a wireless charging status of other electronic devices. For example, FIG. 6 depicts an example wireless charging environment 600 in which multiple portable electronic devices are wirelessly charging on a given wireless charging station 610 (a wireless charging pad, for example). In this manner, the wirelessly charging electronic devices may include a tablet 614, a headphone 618 (a Bluetooth headphone, for example), and a wireless charging-compatible battery charger holder 622 that holds rechargeable batteries 624.

As shown for this example implementation, the notebook computer 150 is not being charged by the wireless charging station 610. However, in accordance with further example implementations, the notebook computer 150 may also be in the process of being wirelessly charged by the wireless charging station 610 or another wireless charging station. The wireless charging controller 152 (see FIG. 1) of the notebook computer 150 for this example implementation communicates over a relatively short range communication link 650 (a Bluetooth communication link, for example) with a controller 630 of the wireless charging station 610 for purposes of regulating the wireless charging of one or multiple various electronic devices. In this regard, one or more of the wireless charging devices 614, 618 and 622 may be owned by the same user and have corresponding identifications (IDs) to allow the wireless charging controller 152 to acquire specific wireless charging information about the devices 614, 618 and 622 via radio frequency (RF) communications with a wireless interface 631 of the controller 630.

In accordance with example implementations, the wireless charging controller 152 may produce, for example, a message 660 on the computer's display 160 indicating the power level(s) that are being supplied to one or multiple charging devices. Moreover, the wireless charging controller 152 may indicate further information, such as compatibilities with wireless charging transmitters, wireless charging standards, relative orientation and other information to, in general, assist the user in a process to wirelessly transfer power to one of the devices 614, 618, 630 and 622, in a manner similar to the assistance discussed above for the notebook computer 150.

Figure 7:
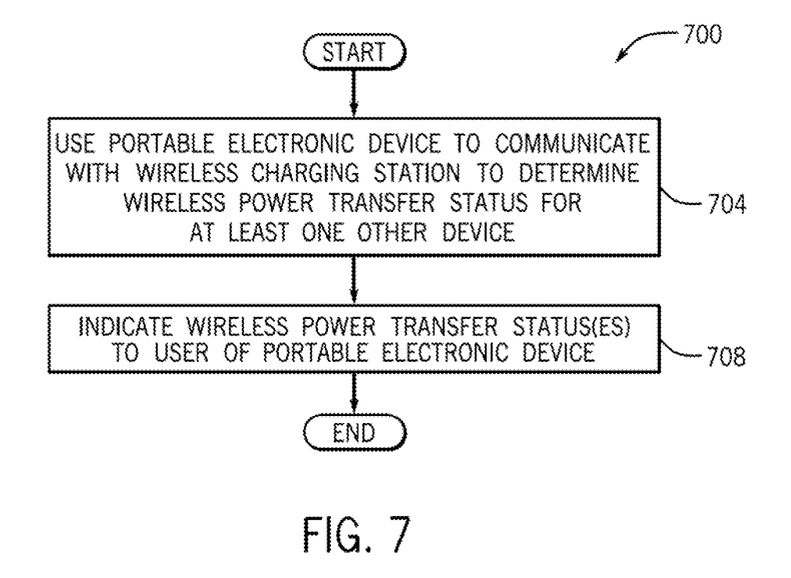
FIG. 7 is a flow diagram depicting a technique to use a portable electronic device to determine a wireless charging status of another device according to an example implementation.

Thus, referring to FIG. 7, in accordance with example implementations, a technique 700 includes using a portable electronic device to communicate with a wireless charging station to determine the power transfer status for at least one other device, pursuant to block 704. An indication of the power transfer status is provided to the user of the portable electronic device, pursuant to block 708.

Referring to FIG. 6 in conjunction with FIG. 1, in accordance with some implementations, the wireless charging station 610 may control the charging of devices on the wireless charging station 610 based on one or multiple behavior profiles, including, as examples, pre-defined (default) behavior profiles and end user-defined behaviors. As examples, a given behavior profile may control the priority and order of charging under certain device configurations, battery charge levels, power demand, charge time duration, the time of day that charging occurs (for purposes of altering charging behavior when placing devices on the charging station at the end of the day, for example), and so forth.

The control of the charging based on behavior profile(s) may be handled in one of numerous ways, depending on the particular implementation. As examples, the wireless charging controller 152 (FIG. 1) of the notebook computer 150 may control the charging based on behavior profile(s); the wireless charging controller 152 may communicate behavior profile(s) to the charging controller 630 of the wireless charging station 610 to allow the controller 630 to control the charging based on the profile(s); or the charging may be control by other coordination techniques between the notebook computer 150 and the wireless charging station 610.

As a more specific example, a given behavior profile may direct sensing and reporting statuses of all devices placed on a charging station but allocate all charging power to the notebook computer 150 (assuming the computer 150 is on the charging station) until the battery charge level of the computer 150 reaches a predetermined percentage. After the battery charge level of the notebook computer 150 reaches the predetermined percentage, then, according to the behavior profile, charging may be activated for both the computer 150 (at a reduced level) and a second device (or more devices, depending on the profile) on the charging station.

Other combinations of charge control scenarios may be controlled by the behavior profiles, in accordance with other implementations, and the profiles may either be pre-defined and/or manually configured by the user.

Figure 8:
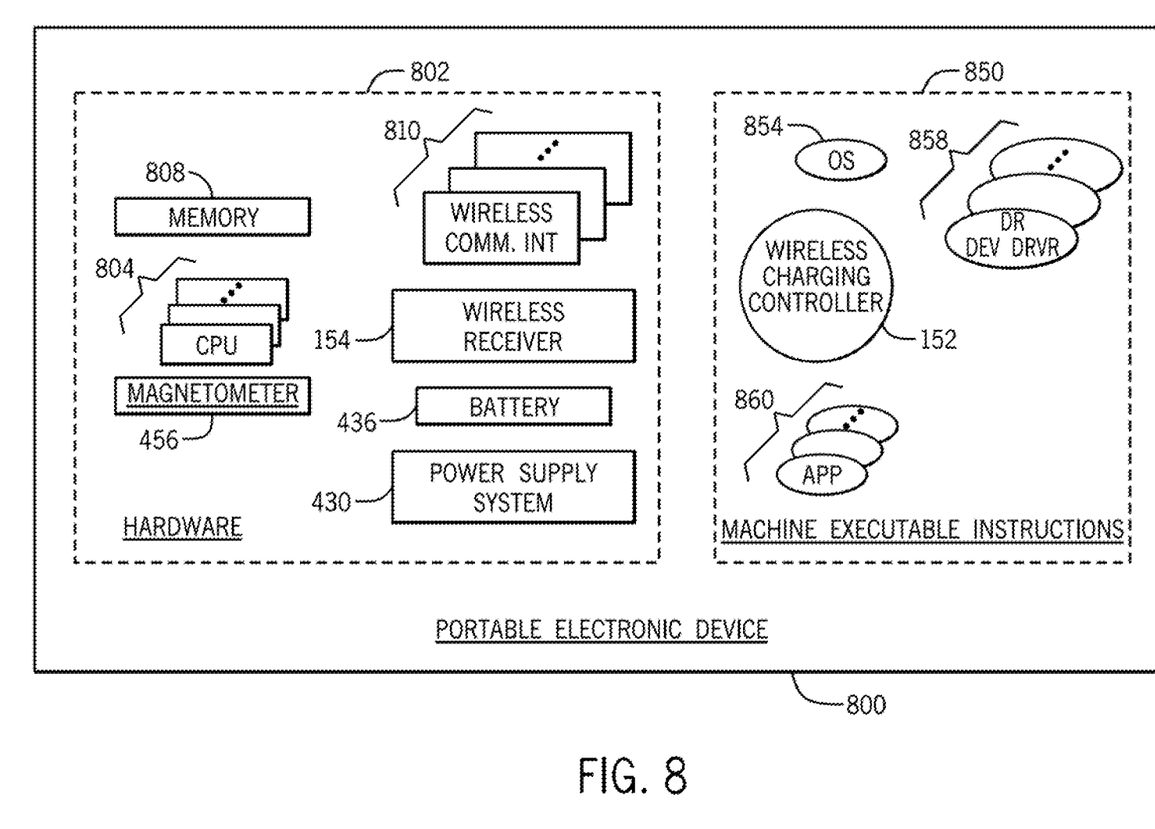
FIG. 8 is a schematic diagram of a portable electronic device according to an example implementation.

Referring to FIG. 8, in accordance with example implementations, the notebook computer 150 is a physical machine that is made up of actual hardware 800 and actual machine executable instructions 850, or "software." In this manner, the hardware 800 may include, as examples, one or multiple central processing units (CPUs) memory 808, the magnetometer 456, the power supply system 430, the battery 151, one or multiple wireless receivers 154 and one or multiple wireless communication interfaces 810.

The machine executable instructions 850 may include, for example, instructions, that when executed by the CPU(s) 804 may cause the CPU(s) 804 to form an operating system 854, one or more device drivers 858 and one or more applications 860. Moreover, as depicted in FIG. 8, in accordance with example implementations, the wireless charging controller 152 may be formed by the CPU(s) 804 executing machine executable instructions. However, in accordance with further example implementations, the wireless charging controller 152 may be formed by dedicated circuitry or hardware. Thus, many implementations are contemplated, which are within the scope of the appended claims.

Other implementations are contemplated, which are within the scope of the appended claims. For example, in a further implementation, a single coil of a portable electronic device may be used to detect an electromagnetic field for purposes of detecting whether the field is associated with an incompatible or compatible wireless charging transmitter. In a further implementation, the portable electronic device may base a determination of whether compatibility exists on the success or failure of subsequent communication (after detection of an electromagnetic field) with a wireless charging station.

While the present techniques have been described with respect to a number of examples, it will be appreciated that numerous modifications and variations may be applicable therefrom. It is intended that the appended claims cover all such modifications and variations as fall within the scope of the present techniques.

What is claimed is:

1. A method comprising:
    sensing a wireless charging station comprising a wireless charging transmitter and determining a status for a machine based at least in part on the sensing of the wireless charging station, wherein sensing the wireless charging station comprises detecting the wireless charging transmitter of the wireless charging station; and
    assisting a process to wirelessly transfer power to the machine, wherein assisting comprises causing the machine to provide guidance to a user of the machine based at least in part on the determined status, wherein assisting the user of the machine with a process to wirelessly transfer power to the machine comprises at least one of the following:
       using the machine to provide an indication of a compatibility of a wireless charging standard used by the machine relative to a wireless charging standard used by the wireless charging station;
       using the machine to provide an indication of a compatibility of a wireless charging transmitter of the wireless charging station to a wireless charging receiver of the machine, wherein the wireless charging receiver to wirelessly receive power for the machine to charge a battery of the machine or power a function of the machine; and
       using the machine to determine and display a status representing a degree to which the machine may be used while being wirelessly charged.

2. The method of claim 1, wherein:
    sensing the wireless charging station comprises detecting a physical orientation of a wireless charging transmitter of the wireless charging station relative to the machine.

3. The method of claim 1, wherein sensing the wireless charging station comprises at least one of the following:
    using a magnetometer of the machine to detect a magnetic field generated by a wireless charging transmitter of the wireless charging station;
    communicating with the wireless charging station by communicating data using a wireless charging receiver of the machine;
    using a coil of the wireless charging receiver of the machine to detect a magnetic field emanating from the wireless charging transmitter of the wireless charging station; and
    using a plurality of wireless charging coils of the machine to attempt to communicate with the wireless charging station using a plurality of protocols associated with a plurality of associated wireless charging standards.

4. The method of claim 1, wherein
    sensing the wireless charging station comprises:
       monitoring an output of a magnetometer for an indication that a wireless charging transmitter is in proximity to the portable electronic device; and
       in response to the output indicating that the wireless charging transmitter is in proximity to the portable electronic device, locking an indication of magnetic north from the magnetometer.

5. An article comprising a non-transitory computer readable storage medium storing instructions that when executed by a processor-based system cause the processor-based system to:
    determine a wireless power transfer status for a portable electronic device;
    display an indication of the determined status to a user of the portable electronic device;
    selectively initiate wireless charging of a battery of the portable electronic device based at least in part on user feedback to the indication of the determined status; and
    determine and display at least one of the following:
       a compatibility status of a wireless charging receiver of the portable electronic device to a wireless charging transmitter detected to be in proximity to the wireless charging receiver, wherein the wireless charging receiver to wirelessly receive power for the portable electronic device to charge the battery of the portable electronic device or power a function of the machine; and
       a status representing a degree to which the portable electronic device may be used while being wirelessly charged.

6. The article of claim 5, the storage medium storing instructions that when executed by the processor-based system cause the processor-based system to determine and display at least one of the following:
    a compatibility status of a wireless charging receiver of the portable electronic device to a wireless charging transmitter detected to be in proximity to the wireless charging receiver;
    an amount of power to be received by the portable electronic device in response to the portable electronic device being charged by a wireless charging transmitter detected to be in proximity to the portable electronic device; and
    a status representing a degree to which the portable electronic device may be used while being wirelessly charged.

7. The article of claim 6, the storage medium storing instructions that when executed by the processor-based system cause the processor-based system to determine and display a status representing a time for charging a battery of the portable electronic device for a plurality of different use scenarios for the portable electronic device while the battery is being wirelessly charged.

8. The article of claim 6, the storage medium storing instructions that when executed by the processor-based system cause the processor-based system to determine and display a status representing at least one:

a time for the battery to be discharged given a current charge state of the battery; and a current run time for the portable electronic device given the current charge state.

9. The article of claim 5, the storage medium storing instructions that when executed by the processor-based system cause the processor-based system to:

wirelessly communicate with a wireless charging controller to determine a charging status for an electronic device other than the portable electronic device.

10. The article of claim 9, the storage medium storing instructions that when executed by the processor-based system cause the processor-based system to:

wirelessly communicate with a wireless charging controller to regulate charging of at least one of the portable device and the other electronic device based at least in part on a behavior profile.

11. An apparatus comprising:
a central processing unit (CPU);
a battery;
a power supply system to provide power to the central processing unit;
a housing containing the CPU, the battery and the power supply system; and
a controller to:
wirelessly communicate with a wireless charging station on which a portable electronic device is disposed, the portable electronic device being physically separated from the apparatus; and
based on the wireless communication, determine and indicate a wireless power transfer status of the portable electronic device to a user of the apparatus.

12. The apparatus of claim 11, wherein the controller further wirelessly communicates with the wireless charging station to determine a wireless power transfer status of at least one other portable electronic device, and determines and provides an indication of the wireless power transfer status for each of the other portable electronic devices to the user.

13. The apparatus of claim 11, wherein the controller, based on the wireless communication with the wireless station, determines a level of power being wirelessly communicated to the portable electronic device and provides an indication of the determined level to the user.

* * * * *